(12) United States Patent  
Zhu et al.

(10) Patent No.: US 9,329,987 B1  
(45) Date of Patent: May 3, 2016

(54) SYSTEMS AND METHODS FOR DYNAMIC TRACKING OF MEMORY REGIONS

(71) Applicant: Marvell International Ltd., Hamilton (BM)

(72) Inventors: Jun Zhu, San Jose, CA (US); Ofer Zaarur, Brookline, MA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 276 days.

(21) Appl. No.: 13/900,053

(22) Filed: May 22, 2013

Related U.S. Application Data

(60) Provisional application No. 61/659,707, filed on Jun. 14, 2012.

(51) Int. Cl.
  *G06F 11/30* (2006.01)
  *G06F 12/00* (2006.01)

(52) U.S. Cl.
  CPC ............ *G06F 12/00* (2013.01); *G06F 11/3037* (2013.01); *G06F 2201/88* (2013.01)

(58) Field of Classification Search
  None
  See application file for complete search history.

(56) References Cited

U.S. PATENT DOCUMENTS

| | | | |
|---|---|---|---|
| 8,713,275 B2 * | 4/2014 | Zhang et al. | 711/165 |
| 8,838,887 B1 * | 9/2014 | Burke et al. | 711/112 |
| 2013/0268741 A1 * | 10/2013 | Daly et al. | 711/165 |

* cited by examiner

*Primary Examiner* — Adam M Queler
*Assistant Examiner* — Jason Blust

(57) ABSTRACT

System and methods are provided for dynamically determining accesses to memory areas in a memory system. An example system includes a first plurality of tracking units, a second plurality of tracking units, and a controller. The first plurality of tracking units are configured to determine accesses to multiple memory areas during a first time period and select one of the memory areas based at least in part on the determined accesses to the memory areas, a memory area including multiple sub-areas. The second plurality of tracking units are configured to determine accesses to the sub-areas of the selected memory area during a second time period. The controller is configured to generate information related to the determined accesses to the memory areas and the sub-areas in the selected memory area for memory management.

20 Claims, 13 Drawing Sheets

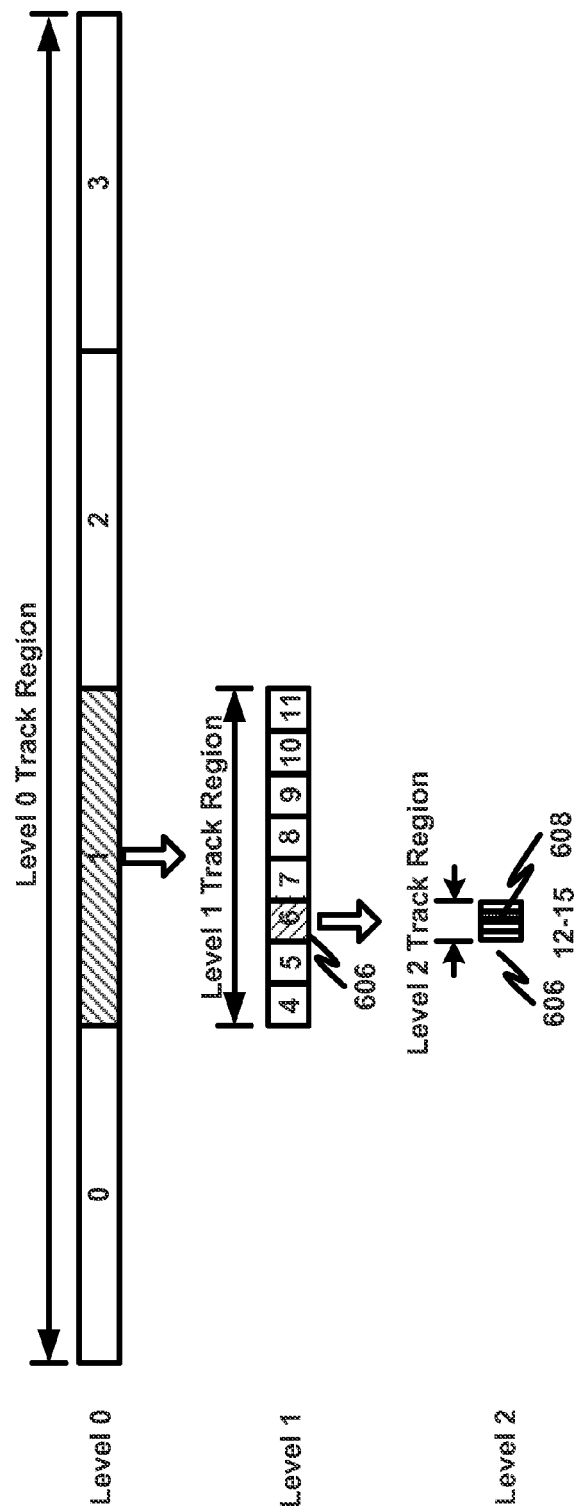

SYSTEMS AND METHODS FOR DYNAMIC TRACKING OF MEMORY REGIONS

CROSS-REFERENCE TO RELATED APPLICATIONS

This disclosure claims priority to and benefit from U.S. Provisional Patent Application No. 61/659,707, filed on Jun. 14, 2012, the entirety of which is incorporated herein by reference.

FIELD

The technology described in this patent document relates generally to memory systems and more particularly to memory management.

BACKGROUND

A memory system, for example, a system-on-chip (SOC) system, often includes a system map which covers memory regions of one or more memory devices, such as off-chip double-data-rate (DDR) memory, or on-die synchronous-random-access memory (SRAM). Different memory regions may receive different number of accesses during normal system operations. For example, the more accesses a particular memory region receives, the hotter the memory region is considered. On the other hand, the less accesses fall in a memory region, the colder the memory region is considered. Thus, temperature information may be associated with a memory region to indicate the number of accesses the memory region receives. Accesses to a memory region may include read requests, write requests, and/or filtering specific accesses (or events).

SUMMARY

In accordance with the teachings described herein, system and methods are provided for dynamically determining accesses to memory areas in a memory system. An example system includes a first plurality of tracking units, a second plurality of tracking units, and a controller. The first plurality of tracking units are configured to determine accesses to multiple memory areas during a first time period and select one of the memory areas based at least in part on the determined accesses to the memory areas, a memory area including multiple sub-areas. For example, the memory areas and the sub-areas may be configured based on a memory space needed for one or more application processes. The second plurality of tracking units are configured to determine accesses to the sub-areas of the selected memory area during a second time period. The controller is configured to generate information related to the determined accesses to the memory areas and the sub-areas in the selected memory area for memory management.

In one embodiment, a computer-implemented method is provided for dynamically determining accesses to memory areas in a memory system. Accesses to multiple memory areas during a first time period are determined. One of the memory areas is selected based at least in part on the determined accesses to the memory areas, a memory area including multiple sub-areas. Accesses to the sub-areas of the selected memory area during a second time period are determined. Information related to the determined accesses to the memory areas and the sub-areas in the selected memory area is generated for memory management.

In another embodiment, a system on chip is configured to dynamically determine accesses to memory areas in a memory system. The system on chip includes a data processor, and a non-transitory computer-readable memory responsive to the data processor and including multiple memory areas. Further, the system on chip includes a first plurality of tracking units, a second plurality of tracking units, and a controller. The first plurality of tracking units are configured to determine accesses to multiple memory areas during a first time period and select one of the memory areas based at least in part on the determined accesses to the memory areas, a memory area including multiple sub-areas. The second plurality of tracking units are configured to determine accesses to the sub-areas of the selected memory area during a second time period. The controller is configured to generate information related to the determined accesses to the memory areas and the sub-areas in the selected memory area for memory management. For example, between processing cycles, the first plurality of tracking units and the second plurality of tracking units may be reused.

BRIEF DESCRIPTION OF THE DRAWINGS

FIGS. 8(a)-8(f) depict example tracking sequences of the hierarchical structure as shown in FIG. 6.

DETAILED DESCRIPTION

It is often important to track the status of different memory regions in a memory system in order to determine which memory regions are hottest or which memory regions are coldest (e.g., to determine accesses/events in different memory regions) for system management purposes. For example, the coldest regions may be gathered together to operate in a low-power mode for power savings, as described in PCT Application No. PCT/US12/55512, filed Sep. 14, 2012, and U.S. patent application Ser. No. 13/616,313, filed Sep. 14, 2012. However, the memory space of a memory system (e.g., a SOC system) is usually very large, e.g., 1 Giga Bytes (GB). In order to track the status of different memory regions in a memory system with fine granularity, a large number of tracking units may need to be used. For example, if a tracking unit is set to track an 8 KB memory region, 65536 tracking units are needed to cover the 1 GB memory space, which may require a lot of hardware components and excessive power consumption. On the other hand, if a small number of tracking units (e.g., 16 tracking units) are used for tracking the entire memory space of the memory system, each tracking unit may need to cover a vast memory region, which often results in poor granularity. In addition, a lot of tasks may need to be performed by software or hardware for the small number of tracking units, such as assigning an initial tracking address for each tracking unit, reading back the results, analyzing the results, and determining a next tracking address for each tracking unit, which may consume a lot of computing power and/or take up a long processing time.

Figure 1:
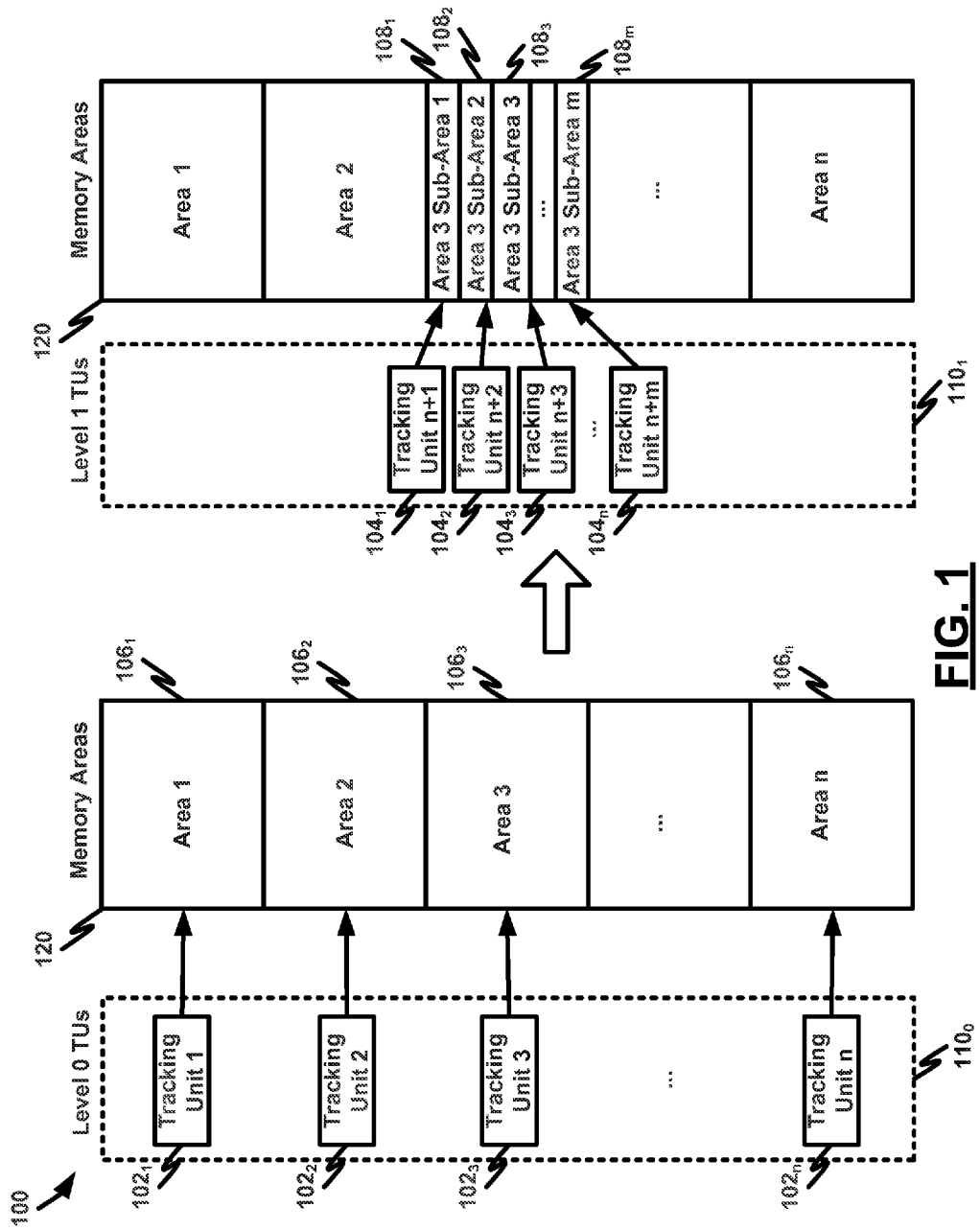
FIG. 1 depicts an example diagram for tracking a memory space in a memory system using multiple tracking units assigned to two tracking levels.

FIG. 1 depicts an example diagram for tracking a memory space in a memory system 100 using multiple tracking units assigned to two tracking levels. As shown in FIG. 1, a number of tracking units (tracking unit 1—tracking unit n+m) are assigned to two different tracking levels (Level 0 and Level 1), for tracking the status of a memory space 120 in the memory system 100. For example, the memory space 120 is needed by one or more application processes.

Specifically, the memory space 120 is divided (e.g., evenly) into a number of areas $106_1, 106_2, \ldots, 106_n$ (n is an integer larger than 1). Tracking units $102_1, 102_2, \ldots, 102_n$ are assigned to the first level $110_0$ (Level 0) for tracking the status of the areas $106_1, 106_2, \ldots, 106_n$ respectively, according to a predetermined tracking policy, e.g., searching for the hottest area among the memory areas $106_1, 106_2, \ldots, 106_n$ during a particular time period (a track window). For example, a particular area $106_3$ is selected as a target area from the areas $106_1, 106_2, \ldots, 106_n$ based on the tracking results of the tracking units $102_1, 102_2, \ldots, 102_n$. Then, tracking units $104_1, 104_2, \ldots, 104_m$ (m is an integer larger than 1) that are assigned to the second level $110_1$ (Level 1) begin to track the status of multiple sub-areas $108_1, 108_2, \ldots, 108_m$ contained in the target area $106_3$, respectively.

The tracking units $104_1, 104_2, \ldots, 104_m$ keep tracking the status of the sub-areas $108_1, 108_2, \ldots, 108_m$, until the status of the area $106_3$ changes and the area $106_3$ is no longer a target area under the predetermined tracking policy of Level 0. For example, the number of accesses that the area $106_3$ receives during a track window drop a log, and thus the area $106_3$ is no longer the hottest area. Another area with the most accesses among the areas $106_1, 106_2, \ldots, 106_n$ is selected as a new target area. Then, the tracking units $104_1, 104_2, \ldots, 104_m$ begin to track the status of the sub-areas contained in the new target area. The previous tracking results of the sub areas $108_1, 108_2, \ldots, 108_m$ may be saved, for example, to a region tag.

Figure 2:
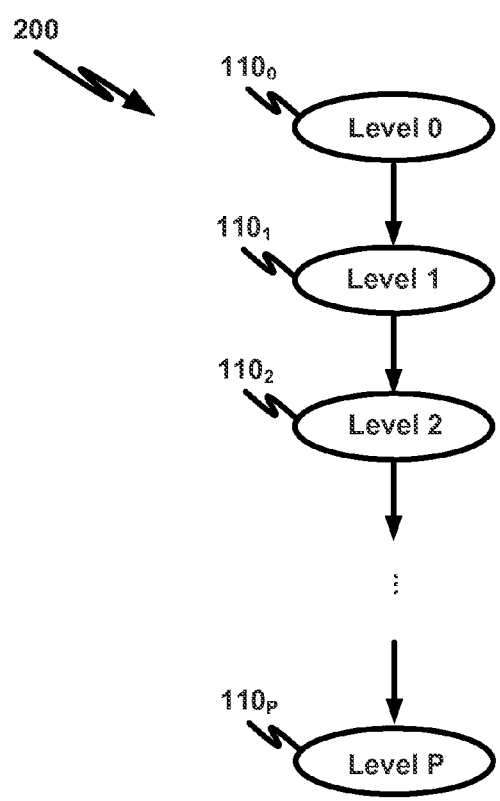
FIG. 2 depicts an example hierarchical structure including multiple tracking levels.

Additional tracking levels may be implemented together with the levels $110_0$ and $110_1$ to form a hierarchical structure to provide more granularity in tracking the memory space, as shown in FIG. 2. FIG. 2 depicts an example hierarchical structure 200 including multiple tracking levels. The hierarchical structure 200 includes a plurality of levels, $110_0, 110_1, 110_2, \ldots, 110_P$ (P is an integer larger than 1), where a number of tracking units are assigned to each tracking level.

Figure 3:
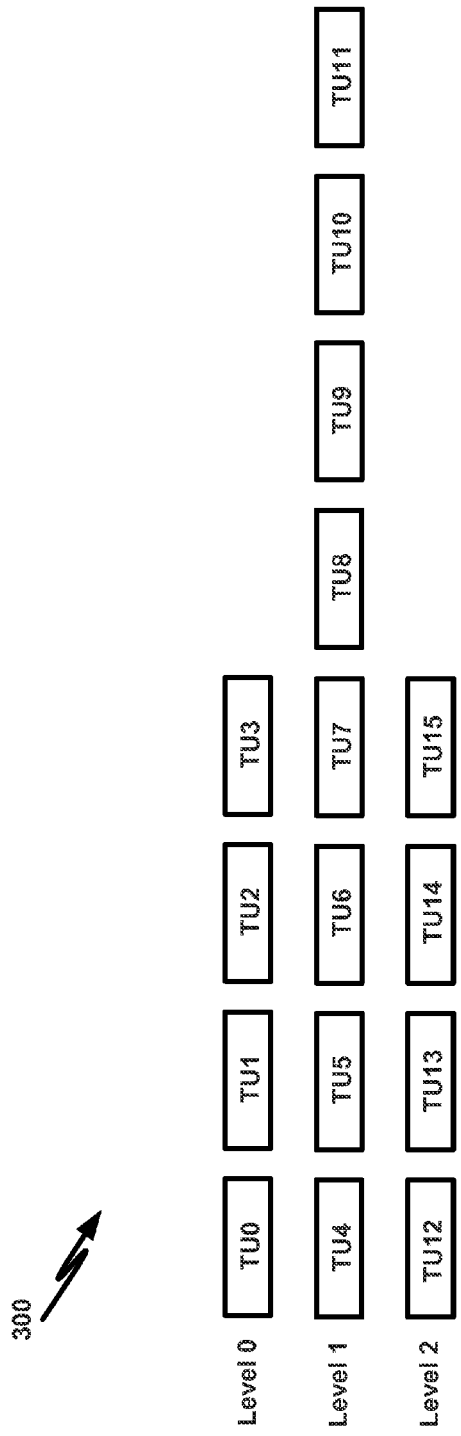
FIG. 3 depicts an example diagram for tracking a memory space in a memory system using sixteen tracking units assigned to a three-level hierarchical structure.

FIG. 3 depicts an example diagram for tracking a memory space in a memory system using sixteen tracking units assigned to a three-level hierarchical structure 300. As shown in FIG. 3, the hierarchical structure 300 includes three tracking levels, Level 0, Level 1, and Level 2. Four tracking units TU0-TU3 are assigned to Level 0, eight tracking units TU4-TU11 are assigned to Level 1, and four other tracking units TU12-TU15 are assigned to Level 2.

Figure 4:
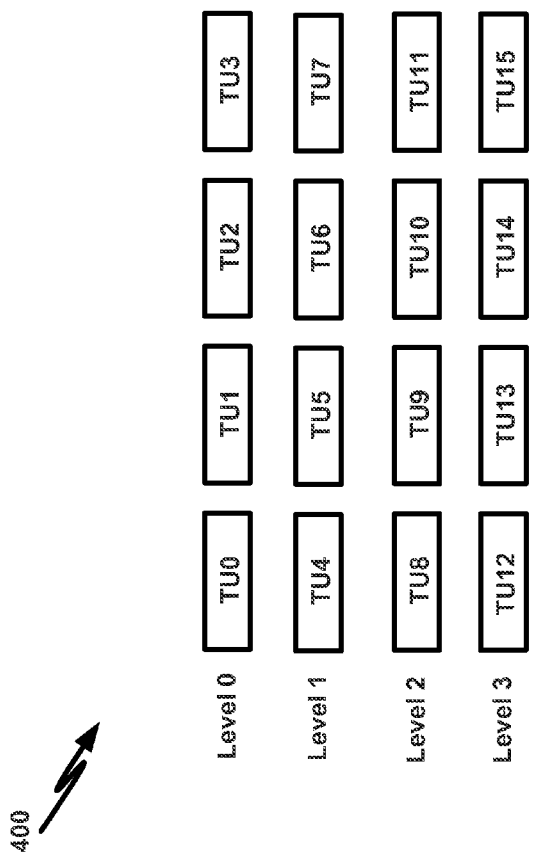
FIG. 4 depicts an example diagram for tracking a memory space in a memory system using sixteen tracking units assigned to a four-level hierarchical structure.

FIG. 4 depicts another example diagram for tracking a memory space in a memory system using sixteen tracking units assigned to a four-level hierarchical structure 400. As shown in FIG. 4, the hierarchical structure 400 includes four tracking levels, Level 0, Level 1, Level 2, and Level 3, and each level is assigned with four tracking units.

For example, a tracking unit, such as $102_1$, may include the following parameters:

"tu_cnt": representing a counter which has a configurable size and is used to count the number of accesses that a designated memory region (e.g., an area, or a sub-area) receives. For example, the size of the counter may be as small as 2 bits. A 24-bit counter, or a 32-bit counter may often be used. In some cases, the number of accesses may exceed a maximum value that the counter can count to cause an overflow. Under such circumstances, the counter may save the maximum value as the number of accesses.

"tu_ctrl_en": representing a counter-enable parameter. For example, when "tu_ctrl_en" includes a logic high value, the counter "tu_cnt" is enabled. Otherwise, the counter "tu_cnt" is disabled.

"tu_ctrl_level": representing a level control specifying which level the present tracking unit is assigned to. For example, if "tu_ctrl_lelvel" is 1, the present tracking unit is assigned to Level 1.

"tu_ctrl_area_id": representing the identification of a particular memory region (e.g., an area, a sub-area) at the designated level that the present tracking unit is tracking.

"tu_stat_color_num": a color indicator indicating a temperature of a memory region (e.g., an area, a sub-area) that the present tracking unit is tracking. For example, if the number of accesses recorded by the counter "tu_cnt" is less than a threshold, e.g., "reg_color_thr0" corresponding to a color threshold register, "tu_stat_color_num" is set to be 0. If the number of accesses recorded by the counter "tu_cnt" exceeds another threshold, e.g., "reg_color_thr1" corresponding to another color threshold register, "tu_stat_color_num" is set to be 1.

Figure 5:
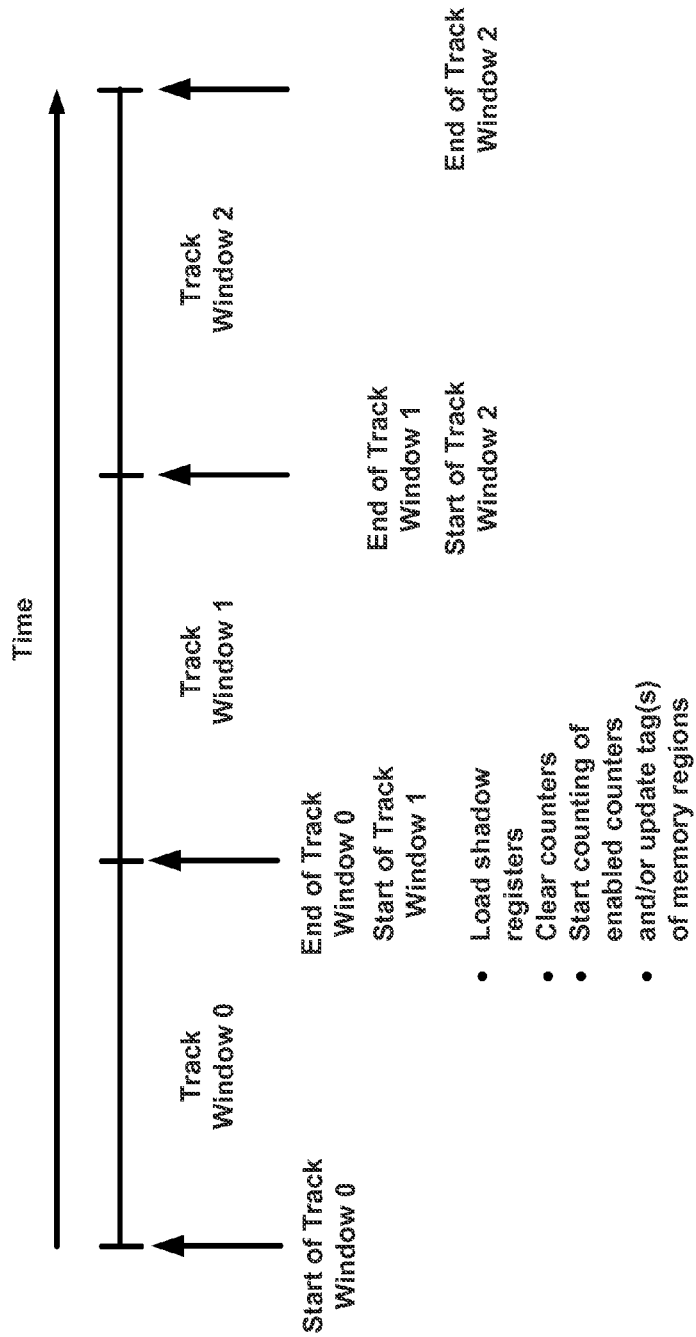
FIG. 5 depicts an example diagram showing multiple track windows.

"tu_stat_shadow_cnt": representing a shadow counter of the counter "tu_cnt." For example, the counter "tu_cnt" counts the number of accesses for a designated memory region (e.g., an area, or a sub-area) during a track window, as shown in FIG. 5. When a particular track window (e.g., Track Window 0 as shown in FIG. 5) ends, the number of accesses recorded by the counter "tu_cnt" is loaded into the shadow counter "tu_stat_shadow_cnt." Also, the counter "tu_cnt" is cleared, and all enabled counters of the present level may be counted. As an example, the track window is determined by a global programmable counter.

The parameters "tu_ctrl_*" as shown above are control parameters whose values are obtained from the system registers, and the parameters "tu_stat_*" as shown above indicate the status of the present tracking unit for system use.

A particular tracking level, such as the level $110_0$, may include the following parameters:

"tl_en": representing a level-enable parameter. For example, when "tl_en" includes a logic high value, the present level is enabled. Otherwise, the present level is disabled.

"tl_tu_num": representing the number of tracking units assigned to the present level. For example, "tl_tu_num" is a power of 2, such as 2, 4, 8, etc. If the memory space associated with the present level is equally divided for all tracking units of the present level, then the size of a memory region for a particular tracking unit is 1/tl_tu_num of the size of the memory space.

"tl_base_addr": representing a base memory address of the present level.

"tl_base_unit": representing a memory unit associated with the base address, e.g. 1 GB, 512 MB, . . . , 1 MB, 512 KB, 256 KB, 128 KB, 64 KB, 32 KB, 16 KB, etc.

"tl_base_update_policy": indicating how to update the parameter "tl_base_addr". For example, if a manual update is selected, "tl_base_addr" may be equal to a register value "reg_tl_base_addr" programmed by software. If an automatic update is selected, "tl_base_addr" may be updated automatically at the beginning of a track window by a parameter "next_base_addr_auto" which is calculated based on another parameter "pre_base_addr_auto" and the status of the tracking levels.

"tl_track_policy": representing the tracking policy which indicates how to determine the parameter "pre_base_addr_auto" for automatic update. For example, the parameter "pre_base_addr_auto" may be determined accordingly when the parameter "tl_track_policy" is defined as follows:

"track-the-coldest": the parameter "pre_base_addr_auto" may be determined to be equal to the address of the coldest memory region of the present level.

"track-the-hottest": the parameter "pre_base_addr_auto" may be determined to be equal to the address of the hottest memory region of the present level.

"track-color0": if a memory region with a color indicator of 0 is found, the parameter "pre_base_addr_auto" may be determined to be equal to the address of such a memory region. Otherwise, the parameter "pre_base_addr_auto" does not change.

"track-colorN": if a memory region with a color indicator of N is found, the parameter "pre_base_addr_auto" may be determined to be equal to the address of such a memory region. Otherwise, the parameter "pre_base_addr_auto" does not change.

"tl_target_area": representing the identification of a memory region (e.g., an area, a sub-area) that is the tracking result associated with a previous track window based on the parameter "tl_track_policy." For example, the parameter "tl_target_area" records the identification of a hottest memory region for the previous tracking-window if the parameter "tl_track_policy" is defined as " track-the-hottest."

"tl_cur_target_area": representing the identification of a target memory region (e.g., an area, a sub-area) associated with a current track window. The parameter "tl_cur_target_area" can be compared with "tl_target_area" to determine the status of the present level. For example, "tl_cur_target_area" may be determined based on information associated with the counters in the tracking units and temperature information (e.g., accesses/events) based on the tracking policies.

Figure 6:
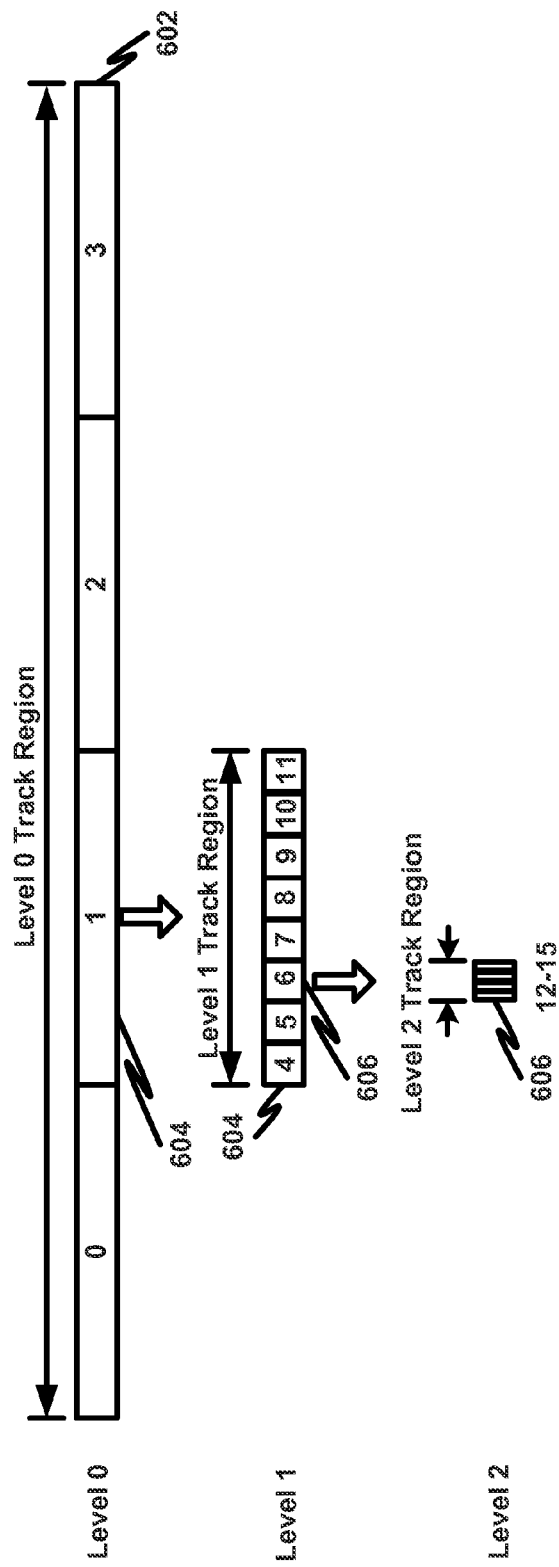
FIG. 6 depicts an example diagram of the hierarchical structure as shown in FIG. 3 tracking a memory space.

FIG. 6 depicts an example diagram of the hierarchical structure 300 tracking a memory space 602. As shown in FIG. 6, the tracking units (TU0-TU3) are assigned to Level 0 to track the memory space 602. A target area 604 is selected according to the tracking policy of Level 0. The tracking units (TU4-TU11) are assigned to Level 1 to track sub-areas of the target area 604 respectively. Then, a target sub-area 606 is selected according to the tracking policy of Level 1. The tracking units (TU12-TU15) are assigned to Level 2 to track the target sub-area 606.

The tracking levels Level 0, Level 1 and Level 2, and the sixteen tracking units TU0-TU15 may be configured using the parameters discussed above. For example, Level 0 is the highest level of the hierarchical structure 300, and the parameter "tl_base_addr" is set to be a root address of the hierarchical structure 300. The update policy of Level 0 may be selected to be manual, and the parameter "tl_base_addr" can be set to a register value "reg_tl0_base_addr." For example, the memory space 602 has a size of 1 MB, with a starting address at {12'h101, 20'h00000}. The starting address is expressed in a standard Verilog format for bus signals, where "12'h" means 12 bits in a hex format, "20'h" means 20 bits in a hex format, and "12'h101" means 12 bits of data with a value 101 in a hex format which is equal to 0x101. Thus, the starting address {12'h101, 20'h00000} indicates a 32-bit signal with a value of 0x10100000 in Verilog. The register value "reg_tl0_base_addr" may be equal to "12'h101." Thus, the parameters of Level 0 may be determined as follows:

| Level 0 | |
|---|---|
| Parameters | Values |
| tl_en | 1 |
| tl_tu_num | 4 |
| tl_base_addr | reg_tl0_base_addr |
| tl_base_unit | 1 MB |
| tl_base_update_policy | manual |
| tl_track_policy | track-the-coldest |

The four tracking units, TU0-TU3, associated with Level 0 may be configured as follows:

| | Tracking Units | | | |
|---|---|---|---|---|
| Parameters | TU0 | TU1 | TU2 | TU3 |
| tu_en | 1 | 1 | 1 | 1 |
| tu_level | 0 | 0 | 0 | 0 |
| tu_area_id | 0 | 1 | 2 | 3 |

Each of four tracking units (TU0-TU3) that are assigned to Level 0 may track a quarter size of the memory space 602. The tracking unit TU0 may track the lowest quarter, 256 KB starting at {12'h101, 2'h0, 18'h00000}, while TU3 may track the highest quarter, 256 KB starting at {12'h101, 2'h3, 18'h00000}.

As an example, the memory area 604 has a size of 256 KB, with a starting address at {Level0.tl_base_addr, coldest tu_area_id of Level0, 18'h00000}. Each of the eight tracking units, TU4-TU11, keeps track of one eighth of the area 604. For example, the tracking unit TU4 tracks a sub-area with a size of 32 KB, and the starting address of the sub-area is {Level0.tl_base_addr, coldest tu_area_id of Level0, 3'h0, 15'h00000}. Moreover, the tracking unit TU5 tracks another sub-area with a size of 32 KB, the starting address of that sub-area is {Level0.tl_base_addr, coldest tu_area_id of Level0, 3'h1, 15'h00000}.

The parameters of Level 1 may be determined as follows:

| Level 1 | |
|---|---|
| Parameters | Values |
| tl_en | 1 |
| tl_tu_num | 8 |
| tl_base_addr | current level base address |
| tl_base_unit | 256 KB (Level0.tl_base_unit/Level0.tl_tu_num) |
| tl_base_update_policy | auto |
| tl_track_policy | track-the-hottest |

The eight tracking units, TU4-TU11 which are assigned to Level 1 may be configured as follows:

| | Tracking Units | | | |
|---|---|---|---|---|
| Parameters | TU4 | TU5 | TU6 | TU7 |
| tu_en | 1 | 1 | 1 | 1 |
| tu_level | 1 | 1 | 1 | 1 |
| tu_area_id | 0 | 1 | 2 | 3 |

| | Tracking Units | | | |
|---|---|---|---|---|
| Parameters | TU8 | TU9 | TU10 | TU11 |
| tu_en | 1 | 1 | 1 | 1 |
| tu_level | 1 | 1 | 1 | 1 |
| tu_area_id | 4 | 5 | 6 | 7 |

In one example, the sub-area 606 has a size of 32 KB with a starting address at {Level1.tl_base_addr, hottest tu_area_id of Level1, 15'h00000}. Each of the four tracking units, TU12-TU15, keeps track of one fourth of the sub-area 606. For example, the tracking unit TU12 tracks a block with a size of 8 KB, and the starting address of such a block is {Level1.tl_base_addr, hottest tu_area_id of Level1, 2'h0, 13'h00000}. The tracking unit TU13 tracks another block with a size of 8 KB, and the starting address of that block is {Level1.tl_base_addr, hottest tu_area_id of Level1, 2'h1, 13'h00000}.

The parameters of Level 2 may be determined as follows:

| Level 2 | |
|---|---|
| Parameters | Values |
| tl_en | 1 |
| tl_tu_num | 4 |
| tl_base_addr | current level base address |
| tl_base_unit | 32 KB (Level1.t1_base_unit/ Level1.tl_tu_num) |
| tl_base_update_policy | auto |
| tl_track_policy | track-the-hottest |

The four tracking units, TU12-TU15 which are assigned to Level 2 may be configured as follows:

| | Tracking Units | | | |
|---|---|---|---|---|
| Parameters | TU12 | TU13 | TU14 | TU15 |
| tu_en | 1 | 1 | 1 | 1 |
| tu_level | 2 | 2 | 2 | 2 |
| tu_area_id | 0 | 1 | 2 | 3 |

Figure 7:
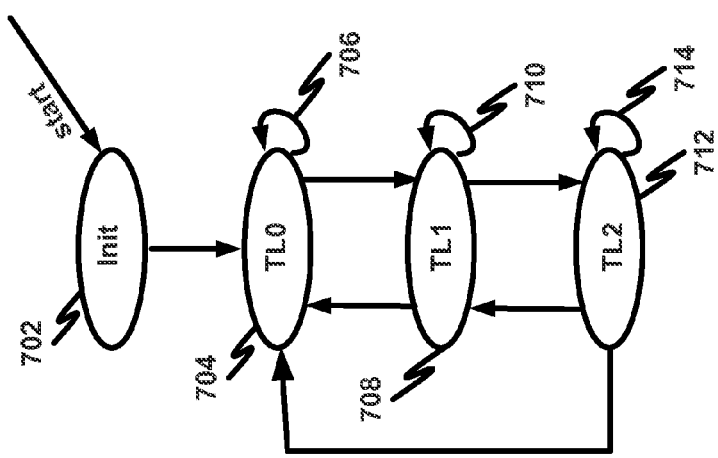
FIG. 7 depicts an example diagram showing tracking operations of the hierarchical structure as shown in FIG. 6.
Figure 8A:
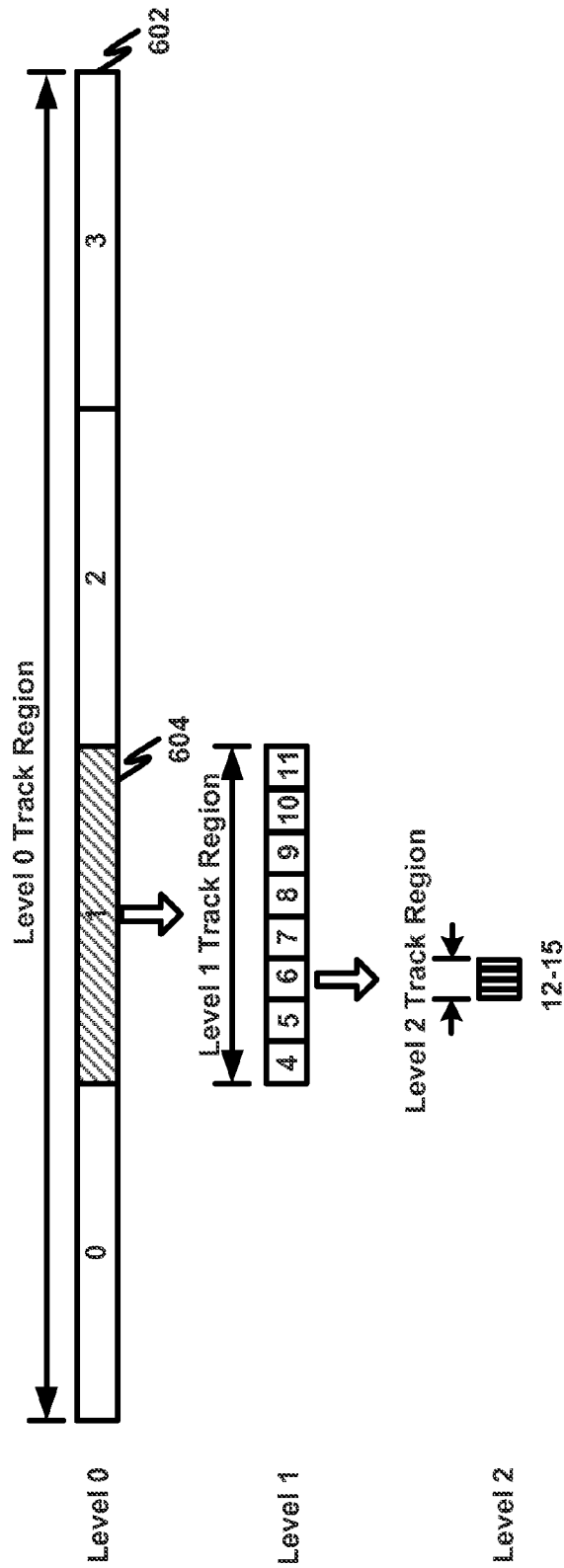
Figure 8B:
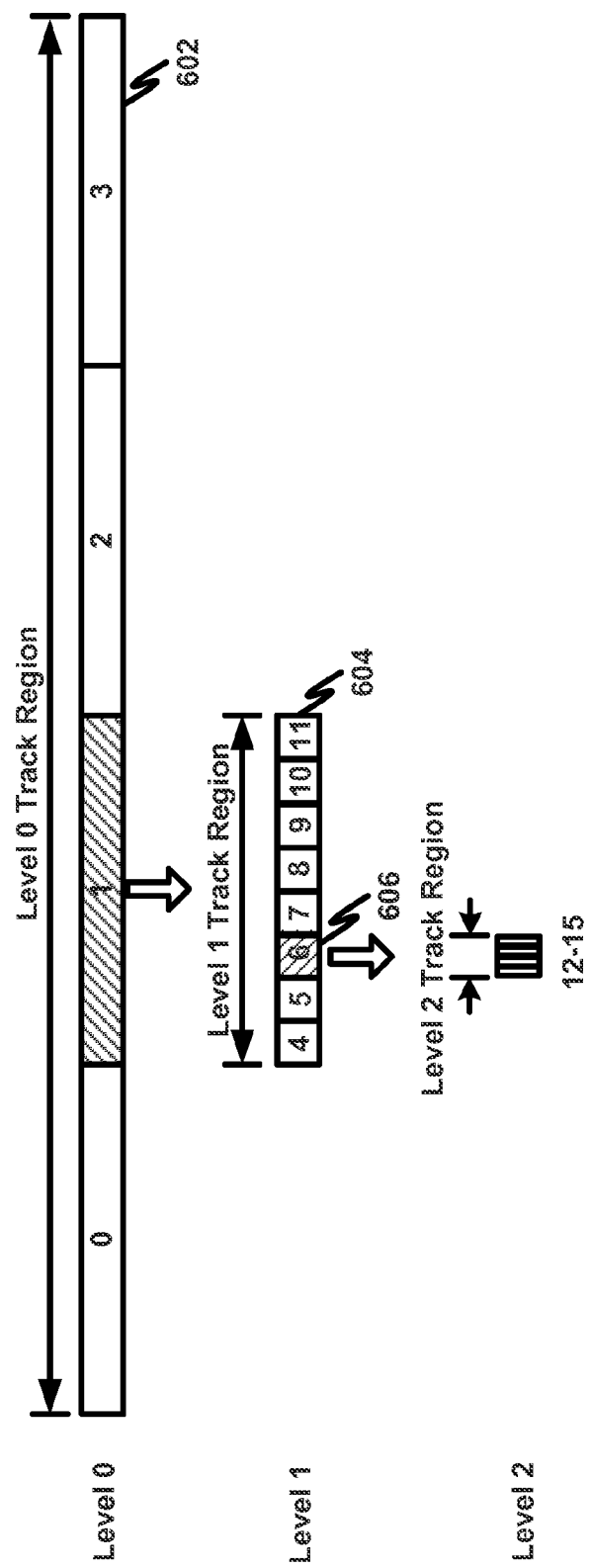
Figure 8D:
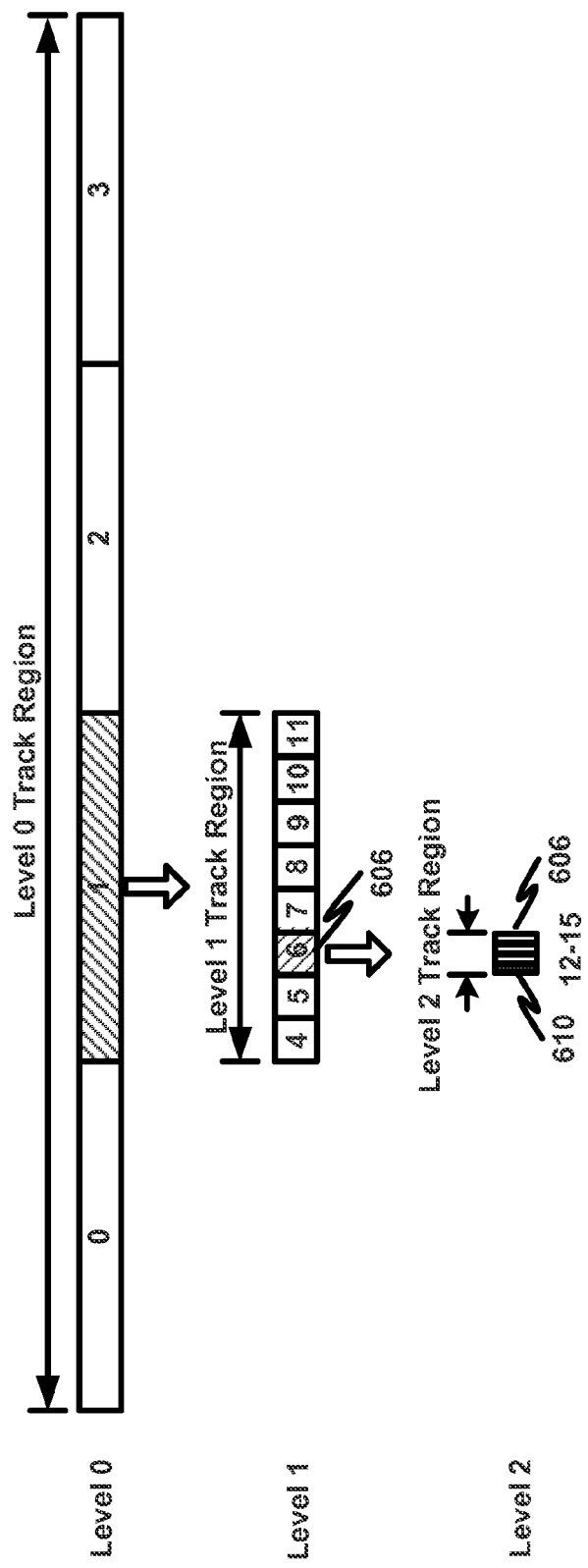
Figure 8E:
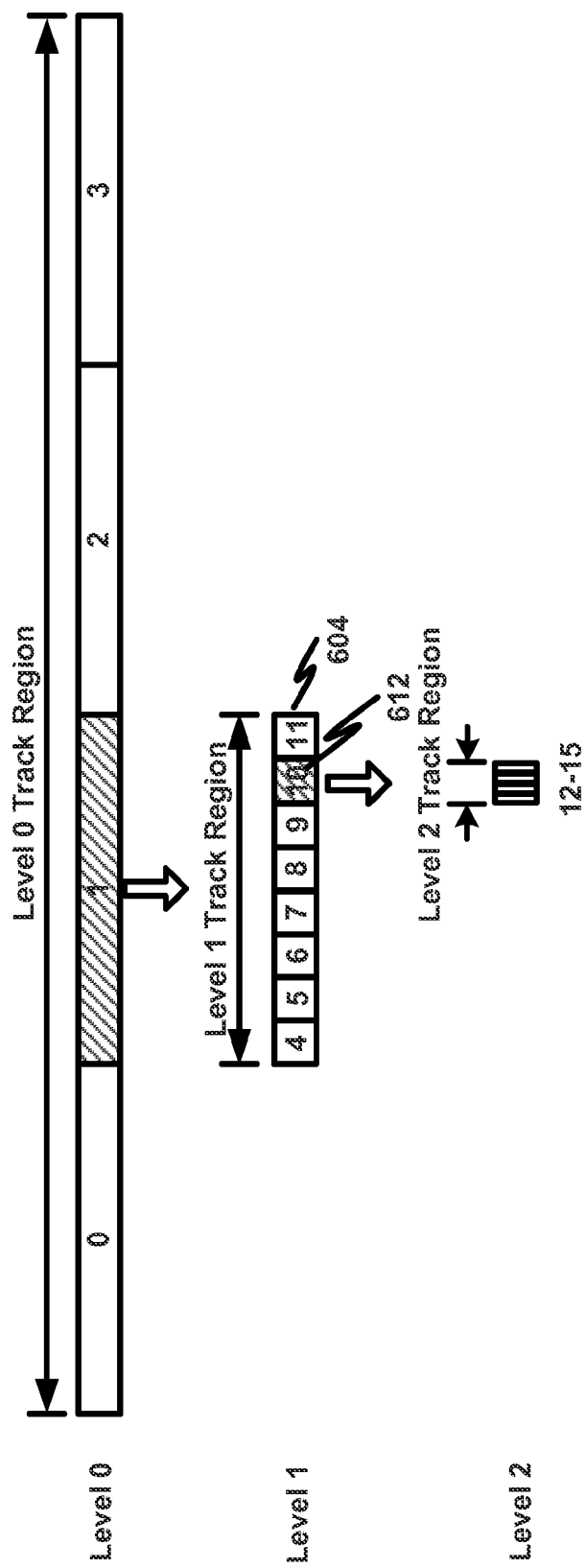
Figure 8F:
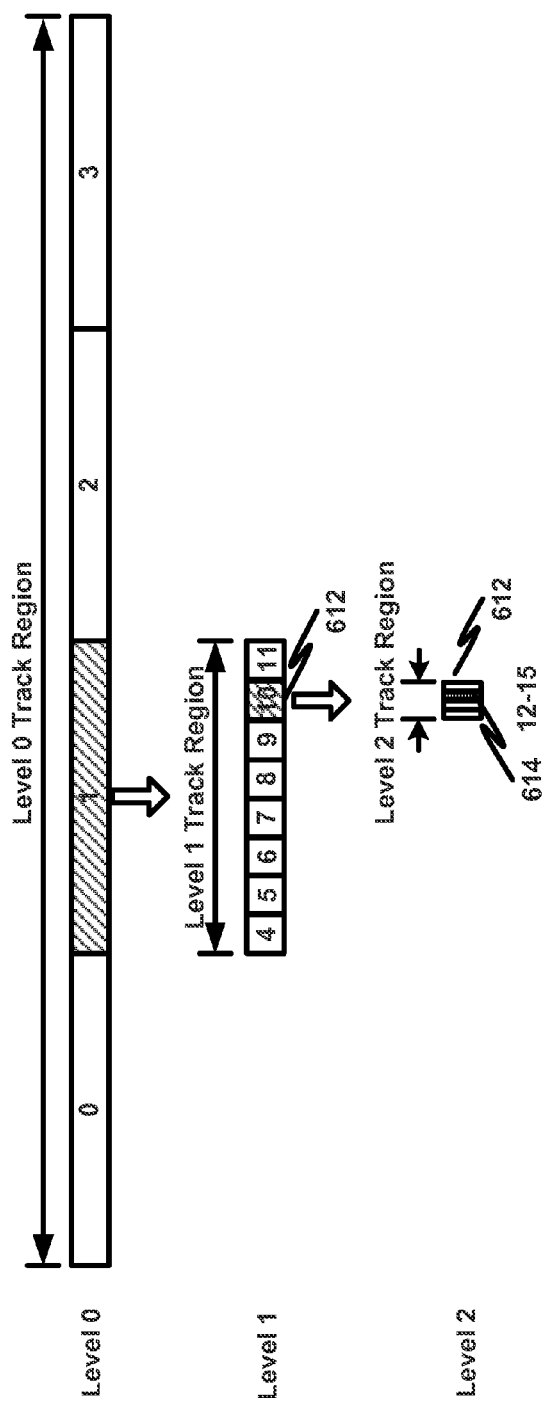

FIG. 7 depicts an example diagram showing tracking operations of the hierarchical structure 300 as shown in FIG. 6. As shown in FIG. 7, at 702, the tracking sequence begins. At 704, the four tracking units (TU0-TU3) assigned to the first tracking level, Level 0, begin to track the status of different areas within the memory space 602, according to a predetermined tracking policy of Level 0. If no target area is found under the predetermined tracking policy (e.g., TL0.tl_cur_target_area!=TL0.tl_target_area), at 706, the four tracking units (TU0-TU3) continue to track the status of different areas within the memory spaces 602.

At the end of a track window, the tracking units (TU0-TU3) find the target area 604 under the tracking policy of Level 0 (e.g., TL0.tl_cur_target_area==TL0.tl_target_area). Then, at 708, the tracking units (TU4-TU11) begin to track the status of the sub-areas of the target area 604, according to a tracking policy of Level 1. If the tracking units (TU4-TU11) do not find any target sub-area under the tracking policy of Level 1 (e.g., TL1.tl_cur_target_area!=TL1.tl_target_area) and the status of the target area 604 has not changed (e.g., TL0.tl_cur_target_area==TL0.tl_target_area), at 710, the tracking units (TU4-TU11) continue to track the status of the sub-areas within the target area 604. If the status of the area 604 has changed (e.g., TL0.tl_cur_target_area!=TL0.tl_target_area) at the end of a track window, the tracking sequence goes back to tracking the status of different areas within the memory space 602 in order to find a new target area under the tracking policy of Level 0.

When the tracking units (TU4-TU11) find the target sub-area 606 according to the tracking policy of Level 1 (e.g., TL1.tl_cur_target_area==TL1.tl_target_area) and the status of the target area 604 has not changed (e.g., TL0.tl_cur_target_area==TL0.tl_target_area), at 712, the tracking units (TU12-TU15) begin to track the status of blocks within the target sub-area 606. As long as the status of the target area 604 has not changed (e.g., TL0.tl_cur_target_area==TL0.tl_target_area) and the status of the target sub-area 606 has not changed (e.g., TL1.tl_cur_target_area==TL1.tl_target_area), at 714, the tracking units (TU12-TU15) continue to track the status of blocks within the target sub-area 606. If the status of the sub-area 606 has changed (e.g., TL1.tl_cur_target_area!=TL1.tl_target_area) and the status of the target area 604 has not changed (e.g., TL0.tl_cur_target_area==TL0.tl_target_area), the tracking sequence goes back to tracking the status of the sub-areas of the target area 604 in order to find a new target sub-area under the tracking policy of Level 1. Furthermore, if the status of the area 604 has changed (e.g., TL0.tl_cur_target_area!=TL0.tl_target_area), the tracking sequence goes back to tracking the status of different areas within the memory space 602 in order to find a new target area under the tracking policy of Level 0.

FIGS. 8(*a*)-8(*f*) depict example tracking sequences of the hierarchical structure 300 as shown in FIG. 6. As shown in FIG. 8(*a*), the tracking sequence begins. At the end of a first track window, the tracking units, TU0-TU3, assigned to Level 0, find the target area 604 within the memory space 602, according to the tracking policy of Level 0. As shown in FIG. 8(*b*), at the end of a second track window, the tracking units, TU4-TU11, assigned to Level 1, find the target sub-area 606 within the target area 604 according to the tracking policy of Level 1, and the status of the target area 604 has not changed. As shown in FIG. 8(*c*), at the end of a third track window, the tracking units, TU12-TU15, assigned to Level 2, find the target block 608 within the target sub-area 606 according to the tracking policy of Level 2, and the status of both the target area 604 and the target sub-area 606 has not changed.

As shown in FIG. 8(*d*), at the end of a fourth track window, the tracking units, TU12-TU15 assigned to Level 2, find a new target block 610 within the target sub-area 606, and the status of the target area 604 has not changed. However, the status of the sub-area 606 has changed. The tracking sequence thus goes back to tracking the sub-areas within the target area 604 in order to find a new target sub-area according to the tracking policy of Level 1.

As shown in FIG. 8(*e*), at the end of a fifth track window, the tracking units, TU4-TU11, assigned to Level 1, find a new target sub-area 612 within the target area 604 according to the tracking policy of Level 1, and the status of the target area 604 has not changed. As shown in FIG. 8(*f*), at the end of a sixth track window, the tracking units, TU12-TU15, assigned to Level 2, find a new target block 614 within the target sub-area 612 according to the tracking policy of Level 2, and the status of both the target area 604 and the target sub-area 612 remains unchanged.

This written description uses examples to disclose the invention, include the best mode, and also to enable a person skilled in the art to make and use the invention. The patentable scope of the invention may include other examples that occur to those skilled in the art. For example, the systems and methods described herein may be implemented to provide a programmable tree structure and a dynamic tracking algorithm for tracking memory regions. In another example, the systems and methods described herein may be implemented to provide a programmable tracking policy and update policy. In yet another example, the systems and methods described herein may be implemented in a memory controller to track the memory usage. In yet another example, the systems and methods described herein may be implemented in a SOC system to track the entire SOC system memory map or regions, including different storage media, such as DDR, on-die SRAM, Flash memories, SSD, HDD, etc. In yet another example, the systems and methods described herein may be implemented in a memory-on-demand system, such as the system described in U.S. patent application Ser. No. 13/464,850.

For example, the systems and methods described herein may be implemented on many different types of processing systems by program code comprising program instructions that are executable by the system processing subsystem. Other implementations may also be used, however, such as firmware or appropriately designed hardware configured to carry out the methods and systems described herein. As an example, memory addresses can be defined and configured by software or a register setting. In another example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

What is claimed is:

1. A system for dynamically determining accesses to memory areas in a memory system, the system comprising:
   a plurality of tracking units comprising a plurality of first tracking units and second tracking units, the first tracking units configured to determine accesses to a set of memory areas during a first time period and select one of the memory areas based at least in part on the determined accesses to the memory areas, wherein the number of memory areas is equal to the number of first tracking units, wherein each first tracking unit is assigned to a different one of the memory areas, and wherein a memory area includes multiple sub-areas;
   the second tracking units configured to determine accesses to the sub-areas of the selected memory area during a second time period; and
   a controller configured to assign, prior to the first time period, each of a fixed number of the tracking units as either a first tracking unit or a second tracking unit for the duration of the first and second time periods without reassigning any first tracking unit for the first time period as a second tracking unit for the second time period and without assigning any tracking unit that was unassigned for the first time period as a second tracking unit for the second time period, the controller further configured to generate information related to the determined accesses to the memory areas and the sub-areas in the selected memory area for memory management.

2. The system of claim 1, wherein:
   the plurality of second tracking units are further configured to select one of the sub-areas of the selected memory area, the number of sub-areas is equal to the number of second tracking units, each second tracking unit is assigned to a different one of the sub-areas, and a sub-area includes multiple blocks; and
   the system further comprising a plurality of third tracking units separate from the first and second tracking units and configured to determine accesses to the blocks of the selected sub-area during a third time period.

3. The system of claim 2, wherein:
   the plurality of third tracking units are further configured to select one of the blocks of the selected sub-area, the number of blocks is equal to the number of third tracking units, each third tracking unit is assigned to a different one of the blocks, and a block includes multiple portions; and
   the system further comprising a plurality of fourth tracking units separate from the first, second, and third tracking units and configured to determine accesses to the portions of the selected block during a fourth time period.

4. The system of claim 1, wherein the first tracking units are configured to determine accesses to the set of memory areas during the second time period and select either the same memory area previously selected or a different memory area based at least in part on the determined accesses to the memory areas during the second time period.

5. The system of claim 4, wherein the number of first tracking units during the first time period is equal to the number of first tracking units during the second time period.

6. The system of claim 4, wherein the plurality of second tracking units are configured to determine accesses to the sub-areas of the more recently selected memory area during a third time period.

7. The system of claim 1, wherein one of the plurality of first tracking units includes a counter for counting the number of accesses to a memory area.

8. A computer-implemented method for dynamically determining accesses to memory areas in a memory system, the method comprising:
   assigning, prior to a first time period, each of a fixed number of tracking units as either a first tracking unit or a second tracking unit for the duration of the first time period and a second time period without reassigning any first tracking unit for the first time period as a second tracking unit for the second time period and without assigning any tracking unit that was unassigned for the first time period as a second tracking unit for the second time period;
   determining accesses to a set of multiple memory areas during a first time period using the first tracking units;
   selecting one of the memory areas based at least in part on the determined accesses to the memory areas during the first time period, a memory area including multiple sub-areas;
   determining accesses to the sub-areas of the selected memory area during the second time period using second tracking units; and
   generating information related to the determined accesses to the memory areas and the sub-areas in the selected memory area for memory management.

9. The method of claim 8, further comprising:
selecting one of the sub-areas of the selected memory area, a sub-area including multiple blocks; and
determining accesses to the blocks of the selected sub-area during a third time period using third tracking units that are separate from the first and second tracking units.

10. The method of claim 9, further comprising:
selecting one of the blocks of the selected sub-area, a block including multiple portions; and
determining accesses to the portions of the selected block during a fourth time period using fourth tracking units that are separate from the first, second and third tracking units.

11. The method of claim 8, further comprising:
determining using the first tracking units accesses to the set of memory areas during the second time period and selecting either the same memory area previously selected or a different memory area based at least in part on the determined accesses to the memory areas during the second time period.

12. The method of claim 11, wherein the number of first tracking units during the first time period is equal to the number of first tracking units during the second time period.

13. The method of claim 11, wherein the plurality of second tracking units are configured to determine accesses to the sub-areas of the more recently selected memory area during a third time period.

14. The method of claim 8, wherein determining accesses to multiple memory areas during a first time period includes counting the number of accesses to a memory area.

15. A system on chip configured to dynamically determine accesses to memory areas in a memory system, comprising:
a data processor;
a non-transitory computer-readable memory responsive to the data processor and including multiple memory areas;
a plurality of tracking units comprising a plurality of first tracking units and second tracking units, the first tracking units configured to determine accesses to a set of memory areas during a first time period and select one of the memory areas based at least in part on the determined accesses to the memory areas, wherein the number of memory areas is equal to the number of first tracking units, wherein each first tracking unit is assigned to a different one of the memory areas, and wherein a memory area includes multiple sub-areas;
the second tracking units configured to determine accesses to the sub-areas of the selected memory area during a second time period; and
a controller configured to assign, prior to the first time period, each of a fixed number of the tracking units as either a first tracking unit or a second tracking unit for the duration of the first and second time periods without reassigning any first tracking unit for the first time period as a second tracking unit for the second time period and without assigning any tracking unit that was unassigned for the first time period as a second tracking unit for the second time period, the controller further configured to generate information related to the determined accesses to the memory areas and the sub-areas in the selected memory area for memory management.

16. The system on chip of claim 15, wherein:
the plurality of second tracking units are further configured to select one of the sub-areas of the selected memory area, the number of sub-areas is equal to the number of second tracking units, each second tracking unit is assigned to a different one of the sub-areas, and a sub-area includes multiple blocks; and
the system on chip further comprising a plurality of third tracking units separate from the first and second tracking units and configured to determine accesses to the blocks of the selected sub-area during a third time period.

17. The system on chip of claim 16, wherein:
the plurality of third tracking units are further configured to select one of the blocks of the selected sub-area, the number of blocks is equal to the number of third tracking units, each third tracking unit is assigned to a different one of the blocks, and a block includes multiple portions; and
the system on chip further comprising a plurality of fourth tracking units separate from the first, second, and third tracking units and configured to determine accesses to the portions of the selected block during a fourth time period.

18. The system on chip of claim 15, wherein the first tracking units are configured to determine accesses to the set of memory areas during the second time period and select either the same memory area previously selected or a different memory area based at least in part on the determined accesses to the memory areas during the second time period.

19. The system on chip of claim 18, wherein the number of first tracking units during the first time period is equal to the number of first tracking units during the second time period.

20. The system on chip of claim 18, wherein the plurality of second tracking units are configured to determine accesses to the sub-areas of the more recently selected memory area during a third time period.

* * * * *